Aug. 12, 1941.  A. G. STIMSON  2,252,444
THERMAL RELAY
Filed Feb. 28, 1940
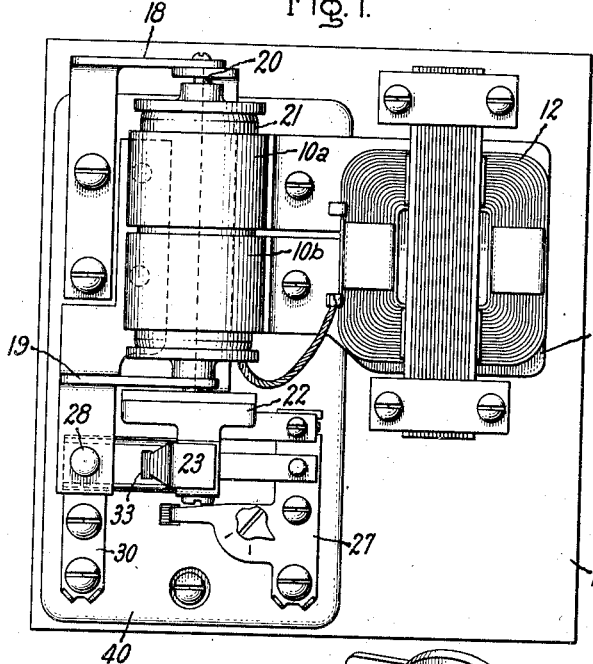
Fig. 1.
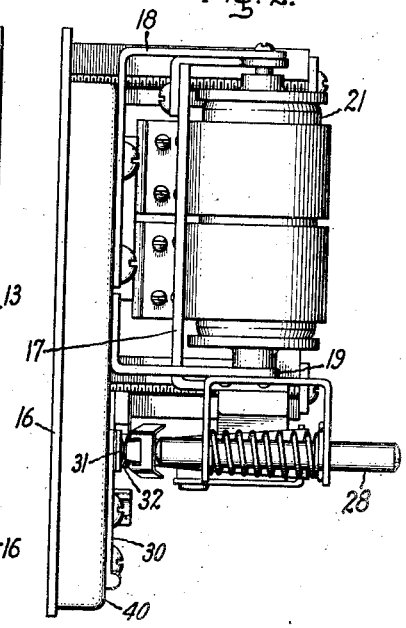
Fig. 2.
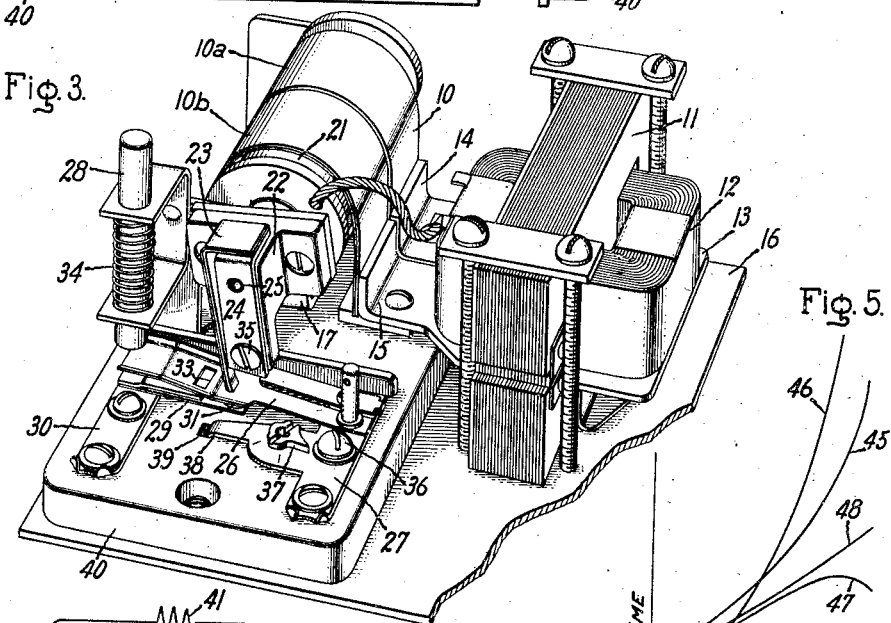
Fig. 3.
Fig. 5.
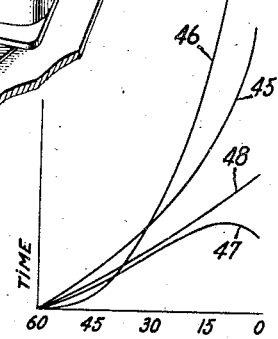
Fig. 4.
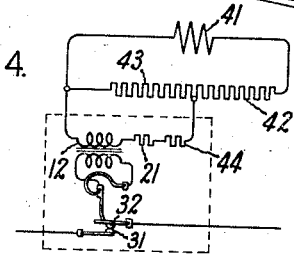
Inventor:
Allen G. Stimson,
by Harry E. Dunham
His Attorney.

Patented Aug. 12, 1941

2,252,444

UNITED STATES PATENT OFFICE 2,252,444

THERMAL RELAY

Allen G. Stimson, Schenectady, N. Y., assignor to General Electric Company, a corporation of New York Application February 28, 1940, Serial No. 321,243

10 Claims. (Cl. 175—294)

My invention relates to thermal relays, more particularly to thermal protective relays for protecting synchronous motors and has for its object a simple and reliable relay of this type.

My invention is especially applicable to the protection of the amortisseur winding of synchronous motors during the starting period and operates after a time delay dependent upon the speed of the motor to deenergize the motor in the event that it does not accelerate to a running speed within predetermined time limits.

In carrying out my invention in one form, I provide a bimetallic thermal element for operating the relay which element is heated by induction from a winding connected in circuit with the discharge resistor of the motor field winding so as to be heated at a rate inversely proportional to the frequency of the field winding voltage and also heated in part by a heating resistor connected in series with the winding.

For a more complete understanding of my invention, reference should be had to the accompanying drawing, Fig. 1 of which is a plan view of a thermal relay embodying my invention; Fig. 2 is a side elevation view of the device shown in Fig. 1; Fig. 3 is a view in perspective of the device shown in Fig. 2; Fig. 4 is a diagram showing the electrical circuit of the relay; while Fig. 5 shows time-frequency curves of the amortisseur winding and the relay.

Referring to the drawing, I have shown my invention in one form as comprising thermally responsive means, shown as a bimetallic thermostat 10, which contitutes an electric conductor and which is heated by induction from a transformer comprising an iron core 11 provided with a primary winding 12 and with a single turn secondary winding electric conductor 13 forming with the thermostat a closed transformer secondary circuit. The thermostat consists of two parallel lengths 10a and 10b, the length 10a having one end secured to one end 14 of the secondary 13 while the length 10b has one end secured to the other end 15 of the secondary. The secondary 13, as shown, is a rigid plate-like member surrounding the middle leg of the core 11, as does also the coil 12, and secured to the core 11 which is, in turn, secured to a suitable support 16. Thus the ends or terminals 14 and 15 of the secondary form supports for the bimetallic lengths 10a and 10b.

The other ends of the lengths 10a and 10b are connected to a cross-bar 17 which is U-shaped and has its ends pivotally mounted on brackets 18 and 19 secured to the base 16. The cross-bar 17 is thus supported for rotation about an axis 20. Furthermore, as shown in the drawing, the lengths 10a and 10b of the thermostat, which are ribbon-shaped, are bent flatwise into an open cylinder formation so as to surround a cylindrical heating resistor 21 also supported on the brackets 18 and 19 but not for rotation. It will be observed that the cross member 17 lies underneath the resistor 21 so that the lengths 10a and 10b substantially surround the resistor and are in good thermal relation with the resistor. It will be observed that this cross-bar 17 electrically and mechanically connects together the ends of the bimetallic lengths 10a and 10b which are connected to the cross-bar.

Also secured to the cross member 17 is a head member 22 made of a suitable electrically insulating material such as a molded compound. This head member carries a second bimetallic thermostat 23 which serves to compensate the relay for changes in ambient temperature. The upper end of this thermostat 23, as seen in Fig. 3, is bent at right angles and is secured to a metal strap 24 which, in turn, is secured by a bolt or rivet 25 to the head 22. The thermostat 23 extends downward at right angles with the axis 20 and its lower end engages a spring contact arm 26. One end of the contact arm 26 is secured to an adjustable terminal member 27 while its other end extends to a point below a spring pressed reset button or plunger 28. Just below the arm 26 is another spring arm 29 having its left end secured to a stationary terminal 30 while its right-hand end extends to a point substantially midway of the arm 26, and carries a contact 31 on its upper surface cooperating with a contact 32 on the lower side of the arm 26.

As shown in Fig. 3, the end of the thermostat 23 is holding the switch arm 26 in its lowermost position with its contact 32 in engagement with the contact 31. Upon an increase in temperature of the thermostat 10, its lengths flex in a direction to uncoil or straighten themselves and thereby rotate the head 22 in a clockwise direction, as viewed in Fig. 3. After a predetermined amount of distortion of the thermostat, the lower end of the thermostat 23 moves into an aperture 33 in the arm 26 whereupon the arm 26 springs upward in accordance with its bias and disengages the contact 32 from the contact 31. After the thermostat has cooled sufficiently, the relay may be reclosed by depressing the plunger 28, which is normally held in a raised position by a coil spring 34, whereupon the head 22 springs back in a counterclockwise direction so that the thermostat 23 again holds the contacts in engagement with each other.

A temperature adjustment is provided for the lower end of the thermostat 23 by turning the strap 24 about the bolt 25 as a pivot. This is done by a member 35 pivoted on the head 22 having an eccentric cam (not shown) cooperating with an elongated aperture in the strap 24. Also for adjustment purposes, the contact arm 26 can be moved lengthwise of itself by loosening the clamping screw 36 and turning an adjustment cam device 37. This adjusts the position of the opening 33 with relation to the thermostat 23. To further assure this longitudinal movement, an extension 38 of the member 27 is bent downward into an elongated aperture 39 in the base 40.

Fig. 4 shows the electrical connections of the device with the rotor field 41 of a synchronous motor. The voltage generated in this field winding during the starting period is normally dissipated in the discharge resistor 42 connected across its terminals. I utilize the voltage of this resistor to energize the winding 12 of the relay, this winding, as shown, being connected across a portion 43 of the resistor with the resistor 21 connected in series with the winding 12 and a second external resistor 44 connected in series with the latter two. The normally engaged contacts 31 and 32 of the relay are connected in circuit with an operating coil of the contactor (not shown) connecting the synchronous motor to a suitable alternating current source so that when the contacts are operated, the motor is deenergized.

It will be understood that the voltage induced in the field winding 41 and therefore the voltage across the resistor 42 remains substantially constant during the starting period. Of course, the voltage induced in the secondary winding 13 of the transformer would, if the closed secondary circuit formed by the winding and the thermostat were open-circuited, be equal to the ratio of the turns of the secondary 13 to the turns of the primary 12 times the voltage impressed on the primary winding 12. The bimetallic thermostat 10 connected in the secondary circuit is constructed to have a low electrical resistance, however, sufficiently low to maintain the secondary 13 substantially short-circuited. Under these short-circuited conditions, the voltage induced in the secondary winding varies with the rate at which the magnetic flux cuts the secondary turns, i. e. with the frequency of the voltage supplied to the primary winding. In other words, as the frequency of the voltage applied to the primary winding 12 is reduced, the secondary induced voltage is reduced proportionately. At the same time, constant voltage being maintained on the primary, the magnetizing current increases in the primary winding. This increase in the magnetizing current produces an increase in the flux cut by the secondary winding and thereby tends to increase the secondary voltage. In other words, this increase in magnetizing current tends to counteract the effect on the secondary voltage of reduced frequency.

The resistances 21 and 44 in circuit with the primary winding 12 prevent the magnetizing current from increasing inversely with the frequency, i. e., inversely with the reactance of the winding. Therefore, with the resistance in circuit with the winding, a decrease in the frequency applied to the winding causes a decrease in the secondary voltage which results in a decrease in the secondary current. In this way, I obtain a time delay which increases with a decrease in frequency. By properly proportioning the reactance of the primary winding and the two resistors 21 and 44, the desired frequency responsive time delay is obtained.

Referring to Fig. 5, the curve 45 is a time-frequency curve showing the allowable running time on the amortisseur winding for the various frequencies induced in the rotor winding 41. These frequencies of course are directly proportional to the slip and the rate of heating of the amortisseur winding but inversely proportional to the speed of the rotor of the synchronous motor. It is desired that the relay open and disconnect the motor from the A. C. supply source after times shorter than those indicated by the curve 45. I have found that the curve 46 shows the operation of the relay when heated solely by induction from the winding 12. It will be noted that the thermostat does not trip the relay in time at the lower frequencies. This is because the inductive heating is disproportionately lower at the lower frequencies.

By using the resistance heater 21, however, the relay characteristics take the form of the curve 47 which, it will be noted, has greater time characteristics at the high frequency than the curve 46 and shorter time characteristics at the lower frequencies. The drooping effect at the end of this curve 47 is caused by the increased magnetizing current of the transformer.

The effect of the external resistance 44, which is located at a distance from the thermostat so as to be thermally insulated from the thermostat, is to maintain a more constant current through the primary winding 12 and thereby raise the curve 47 to the position indicated by the straight line curve 48. It will be observed that the external resistance 44 overcomes the drooping effect at the end of the curve 47. In other words the resistance 44 makes the rate of heating of the thermostat proportional to the frequency. This curve 48, it will be observed, indicates times of operation of the relay well within the permissible time limits of the amortisseur winding indicated by the curve 45. The shape of this characteristic curve 48 of the relay can be varied as desired by varying the relative impedances of the winding 12 and of the resistances 21 and 44.

While I have shown a particular embodiment of my invention, it will be understood of course that I do not wish to be limited thereto, since many modifications may be made and I therefore contemplate by the appended claims to cover any such modifications as fall within the true spirit and scope of my invention.

What I claim as new and desire to secure by Letters Patent of the United States, is:

1. A thermal relay comprising an electric conductor forming a closed transformer secondary circuit, said conductor including thermally responsive means, a primary winding inductively associated with said conductor so as inductively to heat said thermally responsive means, and a heating resistance arranged to heat said thermally responsive means connected in circuit with said primary winding.

2. A thermal relay comprising a bimetallic thermostat, electric conductors forming a closed transformer secondary circuit including said thermostat, a primary winding inductively associated with said secondary winding for inducing heating currents in said thermostat, a heating resistance arranged to heat said thermostat connected in circuit with said primary winding, and a second resistance thermally insulated from said thermostat connected in circuit with said primary winding.

3. A thermal relay comprising a primary winding, a magnetic core for said primary winding, a low voltage secondary winding on said core associated with said primary winding, a heating resistance, a thermostat heated by said resistance, connections between said thermostat and the terminals of said secondary winding whereby said thermostat is inductively heated by said primary winding, a bimetallic thermostatic arm connected to be operated by said first thermostat, switching means operated by the free end of said arm, said arm being arranged to be distorted by changes in ambient air temperature to offset distortion of said first thermostat by changes in the ambient air temperature, and electrical connections connecting said resistance in series circuit with said primary winding.

4. A thermal relay comprising a primary winding, a magnetic core for said primary winding, a low voltage secondary winding on said core associated with said primary winding, a heating resistance, parallel bimetallic thermostatic strips bent flatwise around said resistance so as to be heated by said resistance, connections between a pair of adjacent ends of said strips and the terminals of said secondary winding, a pivoted operated member electrically and mechanically connecting together the opposite ends of said strips whereby said strips are inductively heated by said primary winding, and switching means actuated by said operating member.

5. A thermal relay comprising a primary winding, a magnetic core for said primary winding, a low voltage secondary winding on said core associated with said primary winding, a heating resistance, parallel bimetallic thermostatic strips bent flatwise around said resistance so as to be heated by said resistance, connections between a pair of adjacent ends of said strips and the terminals of said secondary winding, a pivoted operated member electrically and mechanically connecting together the opposite ends of said strips whereby said strips are inductively heated by said primary winding, switching means actuated by said operating member, and electrical connections connecting said resistance in series with said primary winding.

6. A thermal relay comprising a primary winding, a magnetic core for said primary winding, a low voltage secondary winding on said core associated with said primary winding, a heating resistance, parallel bimetallic thermostatic strips bent flatwise around said resistance so as to be heated by said resistance, connections between a pair of adjacent ends of said strips and the terminals of said secondary winding, a pivoted operated member electrically and mechanically connecting together the opposite ends of said strips whereby said strips are inductively heated by said primary winding, a bimetallic thermostatic arm connected to be operated by said operating member, and switching means operated by the free end of said arm, said arm being arranged to be distorted by changes in the ambient air temperature to offset distortion of said strips by changes in the ambient air temperature.

7. A thermal relay comprising a primary winding, a magnetic core for said primary winding, a low voltage secondary winding on said core associated with said primary winding, a heating resistance, parallel bimetallic thermostatic strips bent flatwise around said resistance so as to be heated by said resistance, connections between two adjacent ends of said strips and the terminals of said secondary winding, a pivoted operated member electrically and mechanically connecting together the opposite ends of said strips whereby said strips are inductively heated by said primary winding, a bimetallic thermostatic arm connected to be operated by said operating member, switching means operated by the free end of said arm, said arm being arranged to be distorted by changes in the ambient air temperature to offset distortion of said strips by changes in the ambient air temperature, and electrical connections connecting said resistance in circuit with said primary winding.

8. A thermal relay comprising a primary winding, a magnetic core for said primary winding, a low voltage secondary winding on said core associated with said primary winding, a heating resistance, parallel bimetallic thermostatic strips bent flatwise around said resistor so as to be heated by said resistor, connections between two adjacent ends of said strips and the terminals of said secondary winding, a pivoted operated member electrically and mechanically connecting together the opposite ends of said strips whereby said strips are inductively heated by said primary winding, a bimetallic thermostatic arm connected to be operated by said operating member, a contact member operated by the free end of said arm, said arm being arranged to be distorted by changes in the ambient air temperature to offset distortion of said strips by changes in the ambient air temperature, electrical connections connecting said resistance in series circuit with said primary winding, and a second resistance thermally insulated from said strips connected in series with said primary winding.

9. A thermal relay comprising an electric conductor forming a closed transformer secondary circuit, said conductor including thermally responsive means, a primary winding inductively associated with said conductor so as inductively to heat said thermally responsive means, a heating resistance arranged to heat said thermally responsive means connected in circuit with said primary winding, and a second resistance thermally insulated from said thermally responsive means connected in circuit with said primary winding, said second resistance having a resistance such as to make the rate of heating of said thermally responsive means substantially proportional to the frequency of the voltage applied to said primary winding.

10. A thermal relay comprising a primary winding, a magnetic core for said primary winding, a low voltage secondary winding on said core associated with said primary winding, a heating resistance, thermally responsive means heated by said resistance, connections between said thermally responsive means and said secondary winding whereby said thermostat is inductively heated by said primary winding, electrical connections connecting said resistance in series circuit with said primary winding, and a second resistance thermally insulated from said thermally responsive means and having a resistance such as to make the rate of heating of said thermally responsive means substantially proportional to the frequency of the voltage applied to said primary winding.

ALLEN G. STIMSON.